United States Patent
Liu et al.

(10) Patent No.: US 11,947,985 B2
(45) Date of Patent: Apr. 2, 2024

(54) DATA PROCESSING METHOD AND APPARATUS, AND SERVER FOR ENSURING CONSISTENCY OF DATA PROCESSING PROCESSES OF A PLURALITY OF CONTAINERS

(71) Applicant: HUAWEI TECHNOLOGIES CO., LTD., Shenzhen (CN)

(72) Inventors: Haocheng Liu, Hangzhou (CN); Shiping Deng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/338,137

(22) Filed: Jun. 3, 2021

(65) Prior Publication Data

US 2021/0294623 A1  Sep. 23, 2021

Related U.S. Application Data

(63) Continuation of application No. PCT/CN2019/109049, filed on Sep. 29, 2019.

(30) Foreign Application Priority Data

Dec. 7, 2018 (CN) .................. 201811496958.9

(51) Int. Cl.
*G06F 9/455* (2018.01)
*G06F 9/50* (2006.01)
(Continued)

(52) U.S. Cl.
CPC ........ *G06F 9/45504* (2013.01); *G06F 9/5022* (2013.01); *G06F 9/547* (2013.01); *G06F 12/0223* (2013.01); *G06F 2212/1008* (2013.01)

(58) Field of Classification Search
None
See application file for complete search history.

(56) References Cited

U.S. PATENT DOCUMENTS 10,089,037 B1    10/2018   Bono et al.
2005/0114870 A1   5/2005   Song et al.
(Continued)

FOREIGN PATENT DOCUMENTS

CN    106375371 A    2/2017
CN    107194245 A    9/2017
(Continued)

OTHER PUBLICATIONS

International Search Report issued in corresponding International Application No. PCT/CN2019/109049, dated Dec. 30, 2019, pp. 1-10.
(Continued)

*Primary Examiner* — Eric C Wai
(74) *Attorney, Agent, or Firm* — HAUPTMAN HAM, LLP

(57) ABSTRACT

This application provides a data processing method. The method is applied to a server, the server includes a first container and an Android driver (240), and a first service manager is deployed in the first container. Each container is allocated its respective private memory (2412, 2422, and 2432) and private service linked list (2411, 2421, and 2431), so as to avoid a problem in a conventional technology of data inconsistency and affected service processing caused by sharing of same memory by a plurality of containers.

18 Claims, 4 Drawing Sheets

(51) Int. Cl.
    *G06F 9/54*    (2006.01)
    *G06F 12/02*   (2006.01)

(56) References Cited

U.S. PATENT DOCUMENTS

2014/0337816 A1   11/2014   Chiluvuri
2015/0319144 A1   11/2015   Barton et al.

FOREIGN PATENT DOCUMENTS

CN   108322307 A   7/2018
CN   108667904 A   10/2018
CN   108762815 A   11/2018

OTHER PUBLICATIONS

Chinese Office Action issued in corresponding Chinese Application No. 201811496958.9, dated Mar. 16, 2023, pp. 1-5.
European Search Report issued in corresponding European Application No. 19894072.8, dated Nov. 19, 2021, pp. 1-9, European Patent Office, Munich, Germany.

DATA PROCESSING METHOD AND APPARATUS, AND SERVER FOR ENSURING CONSISTENCY OF DATA PROCESSING PROCESSES OF A PLURALITY OF CONTAINERS

CROSS-REFERENCE TO RELATED APPLICATIONS

This application is a continuation of International Patent Application No. PCT/CN2019/109049, filed on Sep. 29, 2019, which claims priority to Chinese Patent Application No. 201811496958.9, filed on Dec. 7, 2018. The disclosures of the aforementioned applications are hereby incorporated by reference in their entireties.

TECHNICAL FIELD

This application relates to the storage field, and more specifically, to a data processing method and apparatus, and a server.

BACKGROUND

Container technology is a lightweight operating system-level virtualization that allows to run an application service and its dependencies in a process with resources isolated. Components necessary for running of the application service are packaged into an image and can be reused. Compared with VMs, each VM instance needs to run a complete copy of an operating system, and a large quantity of application programs are included in the copy. Therefore, it takes a period of time to start the operating system and initialize the application programs. The container is a lightweight operating system, and its size is much smaller than that of the complete copy of the operating system (generally within 1 MB), and can be started within several seconds. The container has advantages of fast deployment, high efficiency, and higher security, and an application range is becoming wider.

Communication between different processes in a same container may be implemented by using a driver in a kernel of an operating system on a server. During a process of concurrent running of a plurality of containers in a conventional technology, an earlier registered container may first apply for a memory storage space as shared memory by using the driver in the kernel, store request content of each request message by using the shared memory, and record an operation object of each request message by using a global service linked list. Then, a later registered container may re-apply for a new storage space as new shared memory by using the driver in the kernel. In this case, all containers need to switch to a shared memory that is latest applied for to store requested content of each request. Based on the implementation process of the foregoing technical solution, when different containers share a same memory space, data inconsistency may occur, affecting normal running of an application service in the container.

Therefore, how to ensure consistency of data processing processes of a plurality of containers when a plurality of containers run concurrently to avoid affecting normal running of applications in the containers becomes an urgent problem in the industry.

SUMMARY

This application provides a data processing method, to ensure consistency of data processing processes of a plurality of containers during concurrent running of a plurality of containers, and to avoid affecting normal running of an application service in the container.

According to a first aspect, a data processing method is provided, and may be applied to a server, and the server may include a first container and an Android™ driver. First, a first service manager receives a request message of a first process, and the first service manager may send the request message to the Android driver. Then, the Android driver may determine, based on a process identifier PID carried in the request message, a first inter-process communication IPC namespace associated with the first service manager, and determine, based on a pointer of a structure of the first IPC namespace, a first Android namespace associated with the first container. Then, control information in the request message is stored into a first private service linked list in the first Android namespace, and content information in the request message is stored into first private memory in the first Android namespace.

In this application, the first service manager may be deployed in the first container, the first service manager may be configured to manage an application service of the first container, a plurality of application services may run in the first container, and each application service includes at least two processes. Different processes in a same container can communicate with each other.

Specifically, the first process in the first container may send a request message to a second process in the first container, where the request message may include control information, content information, and a process identifier PID of the first service manager. The control information may be used to record identifiers of the first process and the second process, the content information may be used to indicate content and data of the service request, and the process identifier PID of the first service manager may be used to uniquely identify the first service manager.

In a kernel communication mechanism, PIDs of different service managers can be associated with different inter-process communication IPC namespaces. After receiving the request message sent by the first service manager in the first container, the Android driver may determine, based on the PID of the first service manager, the first inter-process communication IPC namespace associated with the first service manager, and obtain, from the structure of the first IPC namespace, a pointer of a structure of the first Android namespace associated with the first container. The Android driver may store the control information in the request message sent by the first service manager into the first private service linked list, and store the content information in the request message sent by the first service manager into the first private memory.

In the foregoing technical solution, each container may use private memory and a private service linked list of the container, so as to avoid a problem in a conventional technology of data inconsistency caused by using shared memory and one global service linked list by a plurality of containers, thereby ensuring consistency of container data processing and normal system running.

In a possible implementation, before the first service manager sends the request message to the Android driver, the Android driver receives a first registration request sent by the first service manager. The Android driver may apply for the first Android namespace for the first container, apply for the first private memory for the first container, and create the first private service linked list.

In this application, before the Android driver receives the request message sent by the first service manager, the first service manager may first initiate a registration procedure to the Android driver. Specifically, the Android driver may apply for the first Android namespace associated with the first container, and may apply for the first private memory and the first private service linked list of the first container.

It should be understood that the first private memory is used only to store content information in a request message sent by a process of the application service in the first container. The first private service linked list is used only to record control information in the request message sent by the process of the application service in the first container.

The Android driver may store an address pointer of the first private memory and a head of the first private service linked list into the structure of the first Android namespace. The Android driver may further store an address pointer of the first Android namespace into the structure of the first IPC namespace based on the PID in the first registration request sent by the first service manager.

In this application, the Android driver may store the address pointer of the private memory, applied for, of the first container and the head of the first private service linked list into the structure of the first Android namespace. The Android driver may further determine, based on the PID in the first registration request sent by the first service manager, the first IPC namespace associated with the first service manager, and store the pointer of the structure of the first Android namespace into the structure of the first IPC namespace.

In the foregoing technical solution, the Android driver may apply for private memory and a private service linked list of a container, and the private memory and the private service linked list are used only to store request information of the container. In this way, a problem in a conventional technology of data inconsistency during concurrent running of a plurality of containers is resolved.

In another possible implementation, during a running process of the container, the Android driver may determine, based on the process identifier PID of the first service manager in the request message sent by the first service manager, the first IPC namespace associated with the first service manager, and obtain the pointer of the structure of the first Android namespace stored in the structure of the first IPC namespace during registration by the first service manager. The Android driver may further obtain, from the structure of the first Android namespace, the address pointer of the first private memory and the head of the first private service linked list that are stored during registration.

In the foregoing technical solution, each container separately uses its respective private memory and private service linked list, which can further avoid a time sequence problem caused when a plurality of containers use shared memory and a shared global data linked list, thereby further reducing service processing duration of a system, and improving working efficiency of concurrent processing of a plurality of containers.

In another possible implementation, the server further includes a second container, a second service manager is deployed in the second container, the second service manager is configured to manage an application service of the second container, and each application service includes at least two processes. After receiving a second registration request sent by the second service manager, the Android driver may apply for a second Android namespace for the second container, and may further apply for a second private service linked list and second private memory of the second container. In this application, the second registration request may include a PID of the second service manager. The Android driver may determine, based on the PID of the second service manager, a second IPC namespace associated with the second service manager, and may store a pointer of a structure of the second Android namespace associated with the second container into a structure of the second IPC namespace. The Android driver may further store a head of the second private service linked list and an address pointer of the second private memory into the structure of the second Android namespace. A process of the application service in the second container may send a request message to the second service manager, where the request message may include control information, content information, and the process identifier PID of the second service manager. The second private memory of the second container applied for by the Android driver is used only to store content information in a request message sent by the second service manager, and the second private service linked list of the second container is used only to store control information in the request message sent by the second service manager.

In the foregoing technical solution, when a plurality of containers run concurrently, each container applies for an associated Android namespace during registration, and applies for its exclusive private memory and private service linked list. The private memory and the private service linked list used by each container are independent, thereby avoiding a problem in a conventional technology that each registration of a new container requires re-application of new shared memory, which causes a complex procedure and time wasting because an earlier registered container needs to be switched to the new shared memory.

In another possible implementation, the method further includes: when the first container needs to be deleted, the Android driver receives a deletion request of the first container, and releases a storage space occupied by the first private service linked list and the first private memory. Specifically, releasing the first private service linked list includes deleting content and a data structure of the private service linked list, and releasing a storage space corresponding to an address of the first private service linked list. Releasing the first private memory includes deleting data in the first private memory.

In the foregoing technical solution, when the first container needs to be deleted, the storage space occupied by the first private service linked list and the first private memory may be released, thereby saving resources.

According to a second aspect, this application provides a data processing apparatus, where the data processing apparatus includes modules configured to perform the data processing method according to any one of the first aspect or the possible implementations of the first aspect.

According to a third aspect, this application provides a server, where the server includes a processor, a memory, a communications interface, and a bus. The processor, the memory, and the communications interface are connected and communicate with each other by using the bus. The memory is configured to store a computer executable instruction. When the server runs, the processor executes the computer executable instruction in the memory to perform the operation steps of the method according to any one of the first aspect or the possible implementations of the first aspect by using a hardware resource in the server.

According to a fourth aspect, this application provides a computer readable storage medium. The computer readable storage medium stores an instruction, and when the instruction runs on a computer, the computer is enabled to perform the methods in the foregoing aspects.

According to a fifth aspect, this application provides a computer program product including an instruction. When the computer program product runs on a computer, the computer is enabled to perform the methods in the foregoing aspects.

Based on the implementations provided in the foregoing aspects, this application may further combine the implementations to provide more implementations.

DESCRIPTION OF EMBODIMENTS

The following describes the technical solutions in this application with reference to the accompanying drawings.

Figure 1:
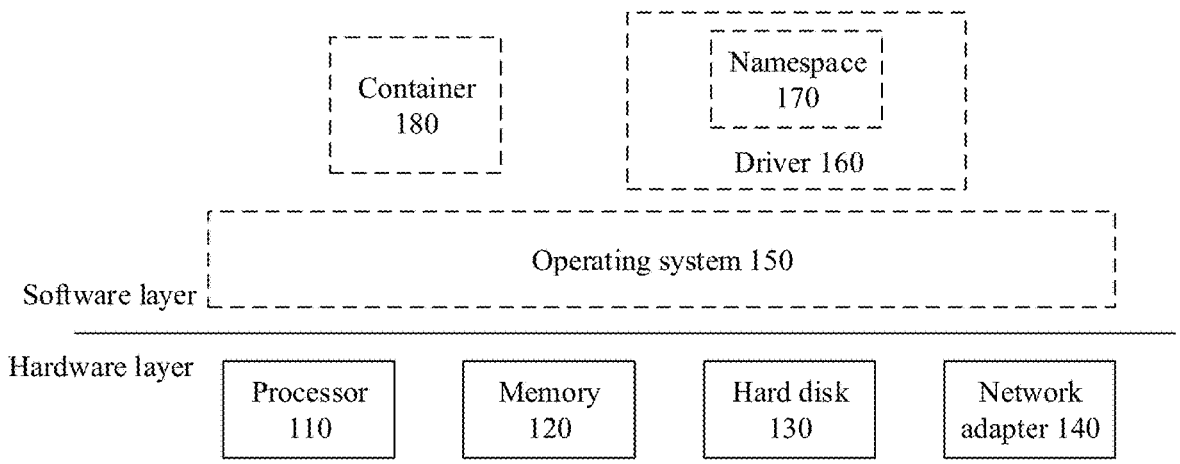
FIG. 1 is a schematic architectural diagram of a container system according to an embodiment of this application.

FIG. 1 is a schematic architectural diagram of a container system according to an embodiment of this application. As shown in the figure, an architecture of the container system may include a hardware layer and a software layer. The hardware layer and the software layer are separately described in detail below.

The hardware layer is not specifically limited in this embodiment of this application, and may be, for example, an X86 server, an advanced reduced instruction set machine (advanced reduced instruction set computing machine, ARM) server, or may be a heterogeneous server.

The hardware layer may include but is not limited to a processor 110, a memory 120, a hard disk 130, and a network adapter 140. The processor 110, the memory 120, the hard disk 130, and the network adapter 140 may be connected by using an internal connection path (for example, a bus).

The software layer includes an operating system 150. The operating system 150 is not specifically limited in this embodiment of this application, and may be, for example, a Linux operating system or a Windows operating system. A driver 160 and a container 180 run on the operating system 150.

The container 180 is a lightweight operating system-level virtualization that allows us to run an application service and its dependencies in a process with resources isolated. The system architecture shown in FIG. 1 includes a plurality of containers 180, each container 180 may run one operating system, and operating systems running in different containers 180 may be the same or may be different. In the following description of this embodiment of this application, that an Android (Android) operating system runs in the container 180 is used as an example for description. For ease of description, a container running the Android operating system may also be referred to as an Android container (Android in a box, Anbox).

The driver 160 may implement communication between components in the software layer and the hardware layer. It should be noted that the driver 160 is further related to a type of the operating system 150. The driver 160 varies with the operating system 150.

The driver 160 further includes a namespace 170, and the namespace 170 is managed by the driver 160. The namespace 170 is a technology developed to resolve a naming problem in a same scope. A namespace allows a variable, a function name, and a class name to be applied in a local space, while another space can use a same name. This is similar to the following: Different folders can have a same file name, but a same folder cannot have repeated file names. The namespace is similar to this virtual folder. The namespace 170 may be represented by using a structure. In this embodiment of this application, the structure may include but is not limited to a pointer and a head of a linked list.

Figure 2:
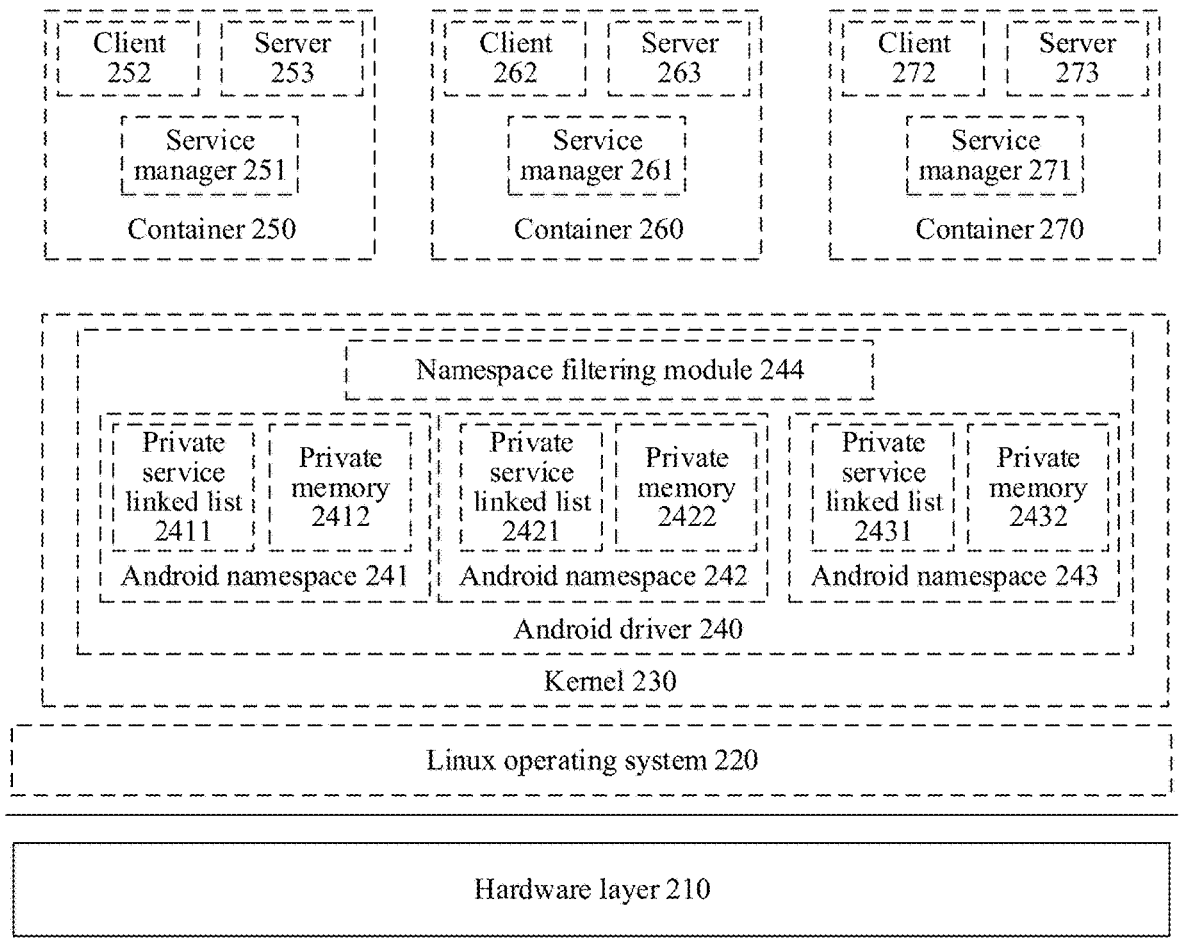
FIG. 2 is a schematic architectural diagram of another container system according to an embodiment of this application.

With reference to FIG. 2, the following describes in detail the technical solutions of the embodiments of this application by using an example in which the operating system 150 is a Linux operating system, the driver 160 is an Android driver, the container 180 is an Android container, and the namespace 170 is an Android namespace. The Android driver may be a binder driver, and the Android namespace may be a binder namespace.

It should be understood that the Android container is a container technology—based virtualization solution. The Android container may use the Android namespace, start and run an Android system in the Linux operating system, and provide an Android application (application, APP).

FIG. 2 is a schematic architectural diagram of another container system according to an embodiment of this application. As shown in the figure, an architecture of the container system may include a hardware layer 210 and a Linux operating system 220.

The Linux operating system 220 includes a kernel 230. The kernel 230 is an important part of the Linux operating system 220, and may be configured to manage some underlying functions. The functions may include but are not limited to scheduling memory and processes. The kernel 230 may further include a driver, for example, an Android driver 240.

The Linux operating system 220 may run one or more Android containers, for example, an Android container 250, an Android container 260, and an Android container 270. One Android container includes at least one Android application service, and each Android application service may run a plurality of processes.

For processes, all memory addresses used are virtual memory addresses, and the virtual memory address can be divided into a plurality of virtual pages. Each process maintains a separate page table. The page table is an array structure that stores a status of each virtual page and is used to record whether each virtual page is mapped. In the Linux operating system 220, each process is allocated a memory address, and the Linux operating system 220 maps such a virtual memory address to a physical memory address. Each process has its respective virtual memory address and cannot operate virtual memory of another process. Each process can operate only its respective virtual memory, and only the Linux operating system 220 has a permission to operate a physical memory address. However, in most cases, data communication between different processes in a same container is inevitable. Therefore, the Linux operating system 220 needs to provide an inter-process communication mechanism.

Based on memory operation permissions of processes, an operation scope of processes can be divided into a user mode and a kernel mode. The user mode may indicate that a process runs in a specific operation mode, has no permission to access physical memory or a device, can only access memory with a limited permission, and cannot access a peripheral device. The kernel mode may indicate that a process can access a protected memory space, and also have all permissions to access an underlying hardware device, for example, the hard disk 130 and the network adapter 140.

Referring to FIG. 2, the Android container 250, the Android container 260, and the Android container 270 may belong to the user mode. The kernel 230 and the Android driver 240 may belong to the kernel mode. In the Android system, the Android container may access the memory by using the Android driver 240 that runs in the kernel mode, so that communication between different processes in the Android container can be implemented, and data is transferred from one process to another process.

It should be understood that the memory in this embodiment of this application may correspond to the memory 120 in FIG. 1.

A service manager (service manager, SM) is deployed in each container. The service manager may manage an application service in the container, and is responsible for communicating with the Android driver 240, so as to implement communication between processes in the container. For example, a service manager 251 in the container 250, a service manager 261 in the container 260, and a service manager 271 in the container 270. A service manager runs in a container or a service manager may be considered as a process in a container where the service manager resides. Correspondingly, for different service managers, a process identifier (process identification, PID) may be allocated for the service manager in the kernel 230.

In the kernel 230, different processes are associated with different inter-process communication (inter-process communication, IPC) namespaces, that is, different processes are isolated by using different inter-process communication namespaces, to implement independence of each process. In this embodiment of this application, a namespace filtering module 244 is further added to the Android driver 240. The namespace filtering module 244 is configured to associate each service manager with an inter-process communication namespace in the kernel 230, and apply for associated Android namespaces in the memory for different containers. For example, the namespace filtering module 244 applies for an associated Android namespace 241 in the Android driver 240 for the container 250, applies for an associated Android namespace 242 in the Android driver 240 for the container 260, and applies for an associated Android namespace 243 in the Android driver 240 for the container 270.

Before each container runs, a registration procedure needs to be completed. For ease of description, the following uses the container 250 as an example to further describe a procedure in which the service manager 251 in the container 250 registers with the Android driver 240 and runs.

(1) Container Registration Process

Before the container 250 runs, the service manager 251 in the container 250 needs to register with the Android driver 240. Specifically, the service manager 251 may invoke an interface to register with the Android driver 240. For example, the service manager 251 may invoke an interface function (for example, an open interface function) of the Android driver 240 by using a preset function (for example, a binder open function) to perform registration.

When the service manager 251 in the container 250 initiates registration to the Android driver 240 by using the preset function, the namespace filtering module 244 in the Android driver 240 may apply for a memory space associated in the memory with the container 250, where the memory space may be referred to as the Android namespace 241. In addition, a structure of the Android namespace 241 may be generated on the Android namespace 241. The structure may include but is not limited to: an address pointer of private memory applied for by the namespace filtering module 244 for the container 250, a head of a private service linked list applied for by the namespace filtering module 244 for the container 250, and a process lock.

It should be understood that a size of a memory space occupied by the Android namespace 241 is the same as a size of a memory space required by the structure of the Android namespace 241. Because information such as a pointer of a private linked list, the head of the private service linked list, and the process lock is stored in the structure of the Android namespace 241, a memory size occupied by the information is fixed. Therefore, the Android driver 240 may apply for, for the container 250 based on a memory size occupied by the structure of the Android namespace 241, the Android namespace 241 associated in the memory.

After applying for the Android namespace 241 associated in the memory for the container 250, the namespace filtering module 244 may apply for private memory 2412 in the memory for the container 250, and create a private service linked list 2411 for the container 250. The private memory 2412 and the private service linked list 2411 are private only to the container 250. The namespace filtering module 244 may store an address pointer of the private memory 2412 into the structure of the Android namespace 241 generated above, and store a head of the private service linked list into the structure of the Android namespace 241.

The service manager 251 runs in the container 250 in a process of registering with the Android driver 240 by the service manager 251 in the container 250, the service manager 251 may also be understood as a process in the container 250 in which the service manager 251 is located, and the kernel 230 allocates a PID for the service manager 251. Therefore, the namespace filtering module 244 may determine, based on the PID of the service manager 251, an inter-process communication namespace associated in the memory with the service manager 251. The namespace filtering module 244 may store a pointer of the structure of the Android namespace 241 associated in the memory with the container 250 into a structure of the inter-process communication namespace associated in the memory with the service manager 251. The structure of the inter-process communication namespace may include the pointer of the structure of the Android namespace 241.

It should be understood that addresses of the private memory 2412 may be consecutive or may be inconsecutive. This is not specifically limited in this embodiment of this application. When the addresses of the private memory 2412 are inconsecutive, they may be stored in the structure of the Android namespace 241 based on a start address of the physical memory and a memory size.

The following uses the private memory 2412 and the private service linked list 2411 of the container 250 as an example for detailed description.

Private service linked list 2411: When the container 250 registers with the Android driver 240, the namespace filtering module 244 may create a private service linked list 2411 of the container 250 in the memory (for example, the memory 120 shown in FIG. 1). A head of the private service linked list 2411 is stored in the structure of the Android namespace 241 associated in the memory with the container

250. The head of the private service linked list 2411 has a pointer that points to the next node address in the linked list.

Private memory 2412: When the container 250 registers with the Android driver 240, the namespace filtering module 244 may apply in the memory (for example, the memory 120 shown in FIG. 1) for a 128-KB storage space that is private to the container 250. During a storage process, the storage space may be dynamically expanded based on a size of stored content in a unit of 1 MB.

It should be noted that an application service running in the container 250 may include a plurality of processes, and different processes in the application service may communicate with each other. That a first process of the application service running in the container 250 sends a request message for inter-process communication to a second process of the application service is used as an example. The request message may include control information and content information.

The namespace filtering module 244 may record the control information in the request message sent by the container 250 into the private service linked list 2411. For example, information recorded in the private service linked list 2411 may include but is not limited to: an identifier ID of the first process, an identifier ID of the second process, information indicating that the first process is a requesting party sending a request message, and information indicating that the second process is a requested party needing to be notified by the server to perform request message processing.

The namespace filtering module 244 may store the content information in the request message sent by the container 250 into the private memory 2412. The content information in the request message includes specific content and data of the service request sent by the first process as a requesting party to the second process. For example, content stored in the private memory 2412 may be that the first process requests to use a service of the second process. For another example, content stored in the private memory 2412 may be that the first process requests to obtain data of the second process in the memory.

In this embodiment of this application, the private memory 2412 may be shared by the kernel-mode Android driver 240 and the user-mode service manager 251, and data is copied. Specifically, when the Android driver 240 applies for the private memory 2412 in the memory for the container 250, a kernel-mode virtual address and a user-mode virtual address may be mapped to a same physical page, so that the user-mode address and the kernel-mode address share one physical page. When the container 250 uses the private memory 2412, the physical address needs to be obtained from an interface of the Android driver 240 by using the service manager 251.

(2) Running Process of the Container 250

In a running process of the container 250, the application service running in the container 250 may include a plurality of processes, and the plurality of processes may communicate with each other. For ease of description, that the first process of the application service running in the container 250 sends an inter-process communication request message to the second process is used as an example for description.

It should be noted that an architecture used in a process of mutual communication between processes in a same container is a client/server (client/server, C/S) architecture, that is, a client and a server are deployed in each container. For example, a client 252 and a server 253 are deployed in the container 250.

The server is configured to manage and schedule each process of the application service to process a request message. The client is configured to receive a request message of each process of the application service. For example, the client may receive a request message for obtaining or using a service by any process. Essentially, the server and the client can be modules implemented by software programs. For example, a first process of an application service in a same container requests communication with a second process. A client receives a request message of the first process to communicate with a second process, and sends the request message to a service manager in which the container is located, the service manager sends the request message to an Android driver, and then the Android driver stores the request message into an Android container associated with the container. The server may obtain the request message in an Android namespace, and notify the second process that there is a request needing to be processed, so as to implement communication between the first process and the second process. The second process, as a client, may use such a notification service provided by the server, to process the request message sent by the first process.

Optionally, in an architecture in which processes in a same container communicate with each other, each process may also serve as a client, and when needing to communicate with another process, the process directly sends a request message to a service manager. The service manager sends the request message to an Android driver, and then the Android driver stores the request message into an Android container associated with the container. The server may obtain the request message in an Android namespace, and notify the second process that there is a request that needs to be processed, so as to implement communication between the first process and the second process. The second process, as a client, may use such a notification service provided by the server, to process the request message sent by the first process.

For example, the first process of the application service in the container 250 may send the request message to the service manager 251 in the container 250. After receiving the request message sent by the first process, the service manager 251 in the container 250 may send the request message to the namespace filtering module 244 in the Android driver 240. The namespace filtering module 244 may determine, based on the PID of the service manager 251 in the container 250, the inter-process communication namespace associated in the memory with the service manager 251, and obtain, from the structure of the inter-process communication namespace, the pointer of the structure of the Android namespace 241 associated in the memory with the container 250. The namespace filtering module 244 obtains the address pointer of the private memory 2412 and the head of the private service linked list 2411 from the structure of the Android namespace 241, so that the control information in the request message sent by the first process in the container 250 may be recorded into the private service linked list 2411, and the content information in the request message may be recorded into the private memory 2412. For detailed descriptions of the control information and the content information in the request message, refer to descriptions in the foregoing container registration process. Details are not described herein again.

After the namespace filtering module 244 in the Android driver 240 records the control information in the request message sent by the container 250 into the private service linked list 2411, and stores the content information into the private memory 2412, the server 253 in the container 250 may query, by using the service manager 251, the Android driver 240 for whether there is a request message needing to be processed by the server. Processing the request message by the server may be understood as modifying, by the server, a format of the content information stored by the container 250 in the private memory 2412, so that the second process, needing to process the request message, in the container 250 receives the request message and performs a corresponding action based on the content information in the request message. Optionally, the second process may be in a dormant state, and when the container 250 determines that there is a request message needing to be processed by the second process, the container 250 wakes up the process to process the request message.

Specifically, the server in the container 250 may periodically query, by using the service manager 251, the Android driver 240 for whether there is a request message needing to be processed by the server. The namespace filtering module 244 in the Android driver 240 may determine, based on the PID of the service manager 251, the inter-process communication namespace associated in the memory with the service manager 251, and obtain, from the structure of the inter-process communication namespace, the address pointer of the Android namespace 241 associated with the container 250. The namespace filtering module 244 then obtains the address pointer of the private memory 2412 and the head of the private service linked list 2411 from the structure of the Android namespace 241. Then, the namespace filtering module 244 queries, based on a pointer that points to a next node address and that is in the head of the private service linked list 2411, whether the private service linked list 2411 records that the server in the container 250 needs to notify the second process needing to process the request message. If the private service linked list 2411 records related control information, the control information, recorded in the private service linked list 2411, of the request message is returned to the server in the container 250. The server in the container 250 may copy stored request content from the private memory 2412 based on an address of the private memory 2412, and after modifying a data format of the request content, re-store the request content of the modified data format into the private memory 2412.

In the technical solution provided in this application, each container is allocated its respective private memory and private service linked list, so as to avoid data inconsistency caused by sharing same memory by a plurality of containers in a conventional technology and impact on service processing.

Figure 3A:
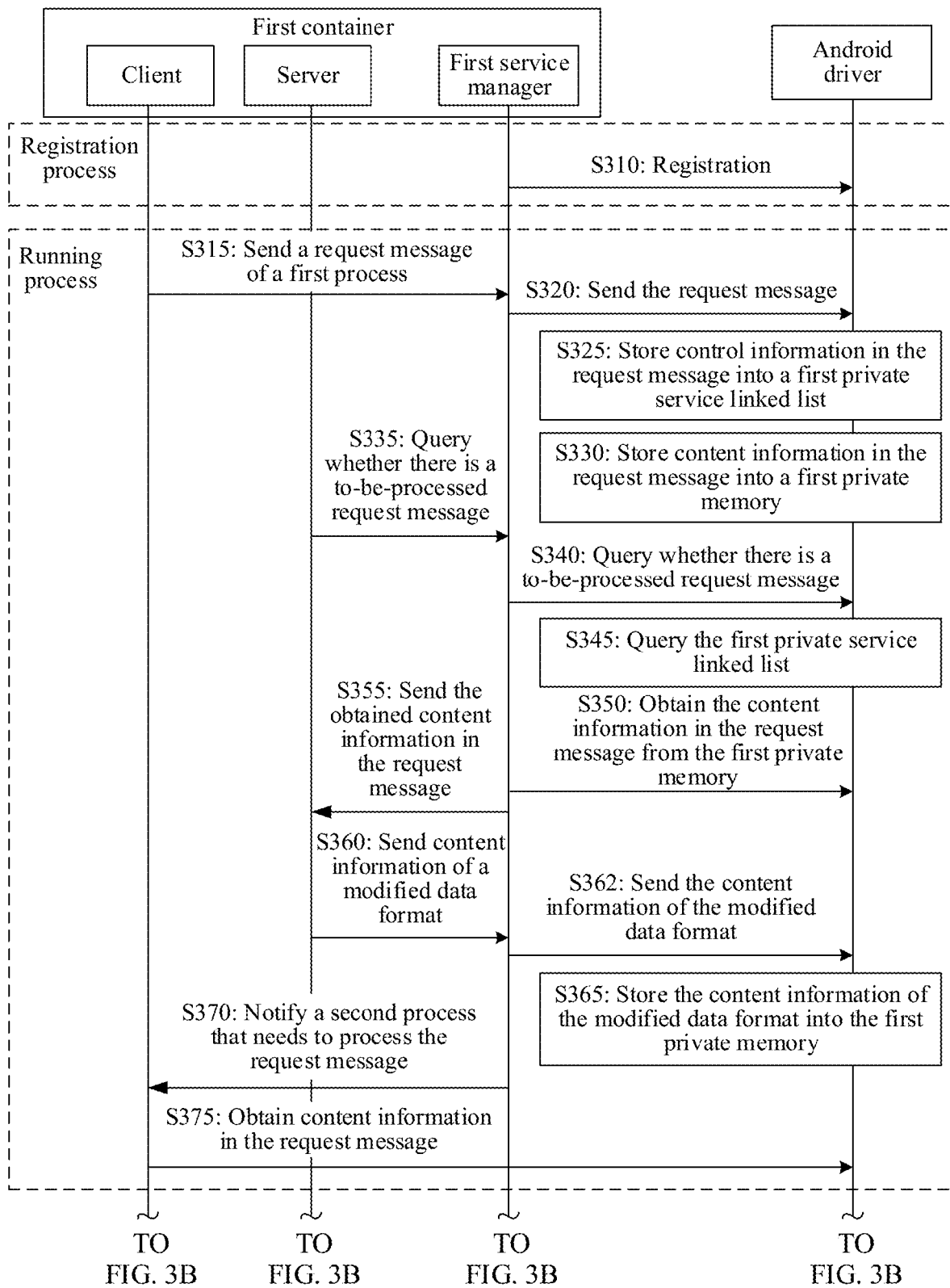
FIG. 3A and FIG. 3B are schematic flowcharts of a data processing method according to an embodiment of this application.
Figure 3B:
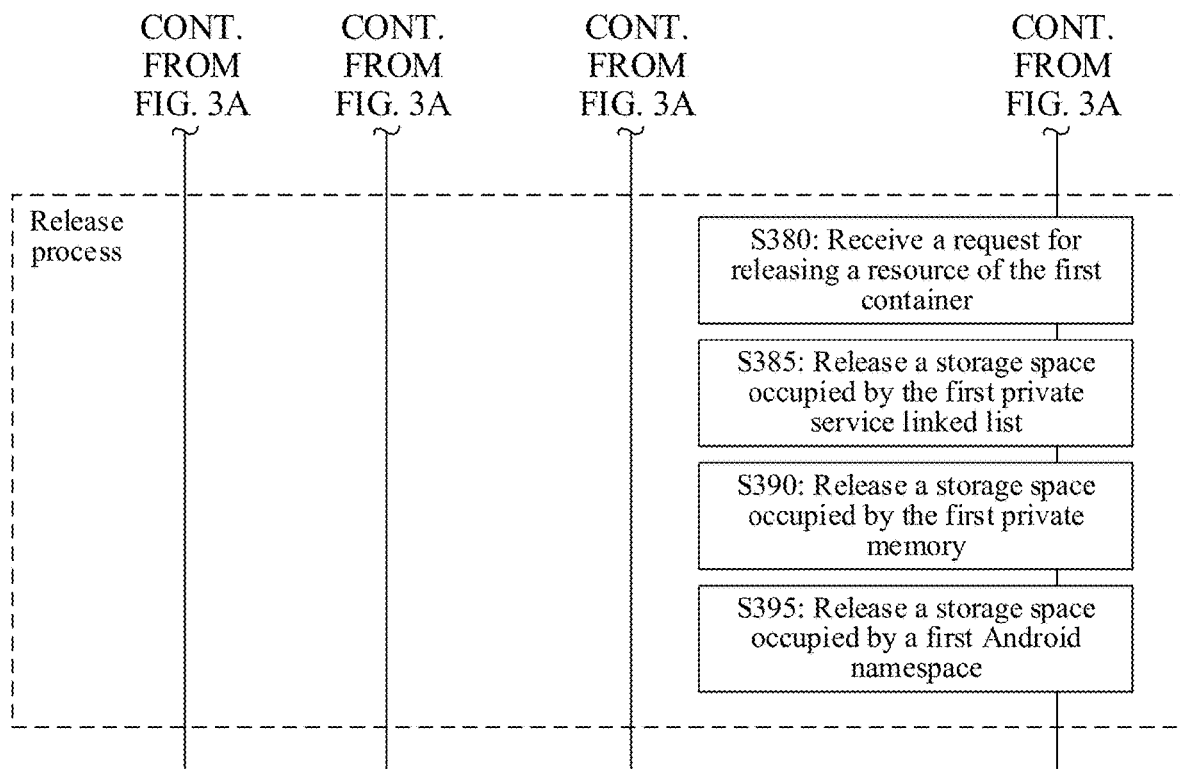

The following further describes a data processing method provided in an embodiment of this application with reference to FIG. 3A and FIG. 3B by using any container as an example. For ease of description, any container is simply referred to as a first container below, the first container includes a first service manager, an Android namespace associated with the first container is a first Android namespace, and the first Android namespace further includes first private memory and a first private service linked list. The example in FIG. 3A and FIG. 3B is merely intended to help a person skilled in the art understand the embodiment of this application, but is not intended to limit the embodiment of this application to a specific value or a specific scenario shown in the example. Apparently, a person skilled in the art may make various equivalent modifications or changes based on the example given in FIG. 3A and FIG. 3B, and such modifications or changes shall also fall within the scope of the embodiments of this application.

FIG. 3A and FIG. 3B are schematic flowcharts of a data processing method according to an embodiment of this application. As shown in the figure, the data processing method includes a container registration process, a running process, and a resource release process. The registration process includes step 310, the running process includes steps 315 to 375, and the resource release process includes steps 380 to 390. The following separately describes the foregoing three processes in detail.

Step 310: A first service manager in a first container registers with an Android driver.

Before running, the first container needs to complete a registration procedure, and the first service manager in the first container may initiate registration to the Android driver by using a preset function. A namespace filtering module in the Android driver applies in memory for first private memory of the first container and creates a first private service linked list of the first container. The first private memory is used only to store content information in a request message sent by a first process of an application service in the first container, and the first private service linked list is used only to record control information in the request message sent by the first process of the application service in the first container. For a detailed registration process, refer to descriptions in FIG. 2. Details are not described herein again.

Step 315: A client in the first container sends a request message to the first service manager.

After registering with the Android driver, the first service manager may process a request message of a process of the application service running in the container. For ease of description, the first process of the application service in the first container is used as an example for description. The first process may serve as a client to send a request message to the first service manager. The request message includes control information and content information. The control information includes but is not limited to an identifier ID of the first process and an identifier ID of the second process. The first process is a requesting party that sends a request message, and the second process is a requested party needing to be notified by the server to perform request message processing. The content information in the request message includes specific content and data of the service request sent by the first process as a requesting party to the second process. For example, the content information may be that the first process requests to use a service of the second process. For another example, the content information may be that the first process requests to obtain data of the second process in the memory.

Step 320: The first service manager sends the request message to the Android driver.

Step 325: The Android driver records the control information in the request message into the first private service linked list.

After receiving the request message sent by the first service manager, the Android driver 240 may obtain, based on a PID of the first service manager, an inter-process communication namespace associated in the memory with the first service manager, and obtain, from a structure of the inter-process communication namespace, a pointer of a structure of a first Android namespace applied for by the first container in the registration procedure. The namespace filtering module may obtain a head of the first private service linked list and an address pointer of the first private memory from the structure of the first Android namespace, so that the control information in the request message sent by the first process in the first container may be recorded into the first private service linked list.

Step 330: The Android driver stores the content information in the request message into the first private memory.

After receiving the request message sent by the first service manager, the Android driver may obtain an address of the first private memory of the first container according to the method in step 325, and may store the content information in the request message sent by the first process into the first private memory.

It should be noted that there is no sequence relationship between step S325 and step S330, and step 325 may be performed before step S330 is performed. Alternatively, step S330 may be performed first, and then step 325 is performed. Alternatively, step 325 and step 330 are performed simultaneously. This is not limited in this application.

Step 335: A server in the first container queries, by using the first service manager, whether there is a to-be-processed request message.

The server in the first container may periodically query, by using the first service manager, whether there is a to-be-processed request message. For example, the first process in the first container needs to send a request message to the second process, and when the server in the first container determines that there is a request message needing to be processed by the second process, the server may notify the second process to process the request message.

Step 340: The first service manager queries, by using the Android driver, whether there is a to-be-processed request message.

Step 345: The Android driver queries the control information recorded in the first private service linked list.

The namespace filtering module in the Android driver may obtain the head of the first private service linked list of the first container in the first Android namespace based on the PID of the first service manager with reference to the method in step 325. The namespace filtering module may query, based on a pointer that points to a next address in the linked list and that is in the head of the first private service linked list, whether the first private service linked list records that the server in the first container needs to notify the second process needing to process the request message. If the first private service linked list records related control information, the control information, recorded in the first private service linked list, of the request message is returned to the server of the first container.

Step 350: The first service manager obtains the content information in the request message from the first private memory.

The first service manager may obtain the content information in the request message based on the address of the first private memory, and send the content information stored in the first private memory to the server of the first container.

Step 355: The first service manager sends the content in the request message to the server of the first container for processing.

The server in the first container may obtain the control information recorded in the first private linked list. When it is determined that the second process in the first container needs to process the request message sent by the first process, the server may process the content information in the request message sent by the first process, so that the second process, needing to process the request message, in the first container 250 receives the request message, and performs a corresponding action based on the content information in the request message.

Processing the request message by the server in the first container may be understood as modifying, by the server, a format of the content information stored by the first process in the first container in the private memory 2412. For example, when the first process in the first container serves as a client to request a service from the server, a preset interface function (for example, a transact interface function) is actually invoked, and a data format of the content information in the request message sent by the first process complies with a structure format of the interface. When notifying the second process that there is a request message needing to be processed, the server also needs to invoke a preset interface function (for example, a notify interface function), and a data format of the content information of the sent request message should comply with a structure format of the interface. Therefore, the server needs to modify a format of the content information stored by the first process in the private memory 2412, so that the second process, needing to process the request message, in the first container can receive the request message, and perform a corresponding action based on the content information in the request message.

Step 360: The server of the first container may send content information of the modified data format to the first service manager.

Step 362: The first service manager sends the content information of the modified data format to the Android driver.

Step 365: The Android driver stores the content information of the modified data format into the first private memory.

The Android driver may delete the information content stored by the first process in the first private memory, and may reassign a storage space in the first private memory, and store the content information of the modified data format into the first private memory.

Step 370: The first service manager notifies the second process in the first container.

After the first process in the first container sends the request message to the first service manager, the second process, needing to be notified by the server, in the first container may be in a waiting state, waiting for the server in the container 250 to notify the second process to process the request message.

It should be noted that when the second process is processing another request message, the second process is in a working state, and the server needs to wait for the second process to complete processing of the another request message. In this case, a plurality of request messages may be stored in a queue, and the request messages may be processed one by one. The queue may be a first in first out (first input first output, FIFO) queue.

Step 375: The waiting second process in the first container obtains content in the request message from the first private memory.

The second process, needing to be notified by the server, in the first container may obtain the content of the request message from the first private memory. Specifically, with reference to the method in step 325, the second process obtains an address pointer of the first private memory in the first Android namespace of the first container, and obtains the content information of the request message stored in the first private memory to which the pointer points.

When the first container needs to be deleted, a resource of the first container is released, and in this case, a resource of the Android namespace associated with the first container is also released. Next, a process of releasing the first Android namespace is further described with reference to steps 380 to 390.

Step 380: The Android driver receives a request for releasing a resource of the first container.

Specifically, the request for releasing a resource of the first container may be generated by an operating system according to an instruction from an operation and maintenance person, or may be sent by a container manager (not shown in FIG. 2) to the Android driver.

Step S385: The Android driver releases the first private service linked list.

The Android driver may determine, based on the PID of the first service manager 251, the first Android namespace associated in the memory with the first container, obtain the head of the first private service linked list stored in the structure of the first Android namespace, and further release a storage space occupied by the first private service linked list. Releasing the first private service linked list includes deleting content and a data structure of the first private service linked list, and then releasing the storage space corresponding to the first private service linked list.

Step 390: The Android driver releases a storage space corresponding to the first private memory address.

The Android driver may determine the first Android namespace of the first container based on the PID of the first service manager, obtain the address pointer of the first private memory stored in the structure of the first Android namespace, and release the storage space occupied by the first private memory to which the pointer points. Releasing the first private memory includes deleting data in the first private memory.

Step 395: The Android driver releases a storage space corresponding to an address of the structure of the first Android namespace.

The Android driver may delete the pointer stored in the structure of the first Android namespace, and may release a storage space occupied by the structure of the first Android namespace.

It should be noted that there is no sequence relationship between step S385 and step S390, and step 385 may be performed before step S390 is performed. Alternatively, step S390 may be performed first, and then step 385 is performed. Alternatively, step 385 and step 390 are performed simultaneously. This is not limited in this application.

This embodiment of this application may further improve performance of concurrent running of a plurality of containers and ensure consistency of data processing processes of a plurality of containers. The following describes, by using the container 250, the container 260, and the container 270 in FIG. 2 as an example, a process of concurrent running of a plurality of container instances in this embodiment of this application.

In a container startup phase, a service manager of each container registers with an Android driver 240, and the Android driver 240 may apply in memory for an Android namespace associated with each container, and private memory and a private service linked list of each container. For example, the Android driver applies for an Android namespace 241 for the container 250, where the Android namespace 241 includes a private service linked list 2411 and a private service linked list 2412. The Android driver applies for an Android namespace 242 for the container 260, where the Android namespace 242 includes a private service linked list 2421 and a private service linked list 2422. The Android container applies for an Android namespace 243 for the container 270, where the Android namespace 243 includes a private service linked list 2431 and a private service linked list 2432. Each private memory is isolated from another and is used to store content information of only one container. Each private service linked list is used to store control information of only one container.

When a plurality of containers run concurrently, a namespace filtering module 244 may determine, based on PIDs of service managers in different containers, different inter-process communication namespaces associated with the service managers, further obtain, from structures of the inter-process communication namespaces, Android namespaces associated with the different containers, and then obtain, from the structures of the Android namespaces associated with the different containers, addresses of private memory and private service linked list addresses of the different containers.

In this embodiment of this application, private memory and a private service linked list that are used only to store data of a single container may be applied for, so as to resolve a data inconsistency problem in a conventional technology caused by using shared memory and a shared global service linked list by a plurality of containers during concurrent running of a plurality of containers. In addition, during registration, each container applies for an associated Android namespace and its exclusive private memory and private service linked list. The private memory and private service linked list used by each container are independent, thereby avoiding a problem in a conventional technology that each registration of a new container requires re-application of new shared memory, which causes a complex procedure and time wasting because an earlier registered container needs to be switched to the new shared memory. In addition, each container separately uses its respective private memory and private service linked list, which can further avoid a time sequence problem caused when a plurality of containers use shared memory and a shared global data linked list, thereby further reducing service processing duration of a system, and improving working efficiency of concurrent processing of a plurality of containers.

The foregoing describes in detail the data processing methods provided in the embodiments of this application with reference to FIG. 1 to FIG. 3A and FIG. 3B. The following describes in detail apparatus embodiments of this application with reference to FIG. 4 to FIG. 5. It should be understood that the description of the method embodiments corresponds to the description of the apparatus embodiments. Therefore, for a part that is not described in detail, refer to the foregoing method embodiments.

Figure 4:
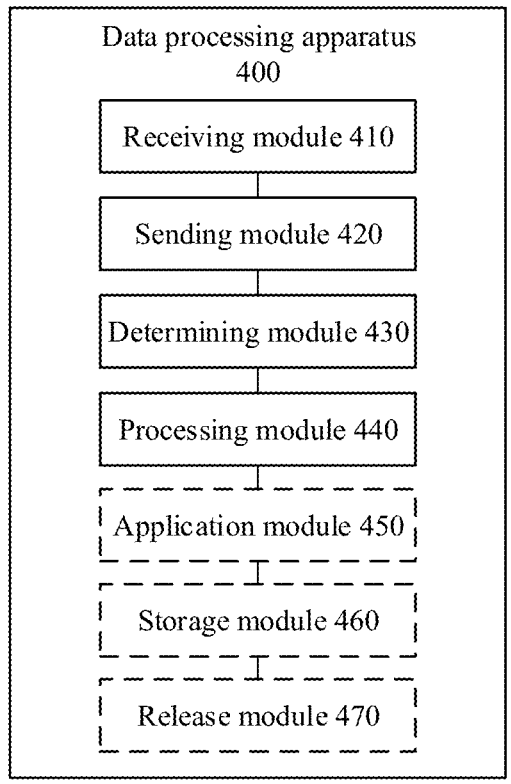
FIG. 4 is a schematic block diagram of a data processing apparatus 400 according to an embodiment of this application.

FIG. 4 is a schematic structural diagram of a data processing apparatus 400 according to an embodiment of this application. The data processing apparatus 400 includes a receiving module 410, a sending module 420, a determining module 430, and a processing module 440.

The receiving module 410 is configured to receive a request message of a first process by the first service manager, where the first process is a process of any application service in the first container, the request message includes control information, content information, and a process identifier PID of the first service manager, the PID is used to uniquely identify the first service manager, the control information is used to record identifiers of the first process and the second process, the second process is a process that is of an application service and that is to process the request message, and the content information is used to indicate content and data of the service request.

The sending module 420 is configured to send the request message to the Android driver by the first service manager.

The determining module 430 is configured to determine, by the Android driver based on the process identifier PID of the first service manager in the request message, a first inter-process communication IPC namespace associated with the first service manager, and determine, based on a pointer of a structure of the first IPC namespace, a first Android namespace associated with the first container, where the first Android namespace is used to record first private memory and a first private service linked list of the first container.

The processing module 440 is configured to: store, by the Android driver, the control information into the first private service linked list, and store the content information into the first private memory.

It should be understood that the data processing apparatus 400 in this embodiment of this application may be implemented by using an application-specific integrated circuit (application-specific integrated circuit, ASIC) or a programmable logic device (programmable logic device, PLD). The PLD may be a complex programmable logical device (complex programmable logical device, CPLD), a field-programmable gate array (field-programmable gate array, FPGA), a generic array logic (generic array logic, GAL), or any combination thereof. Alternatively, when the data processing method shown in FIG. 3A and FIG. 3B may be implemented by using software, the data processing apparatus 400 and the modules of the data processing apparatus 400 may be software modules.

Optionally, in some embodiments, the data processing apparatus 400 further includes an application module 450.

The receiving module 410 is further configured to receive, by the Android driver, a first registration request sent by the first service manager, where the first registration request includes the PID of the first service manager.

The application module 450 is configured to apply, by the Android driver, for the first Android namespace for the first container.

The application module 450 is further configured to apply, by the Android driver, for the first private memory for the first container, and create the first private service linked list.

Optionally, in some embodiments, the data processing apparatus 400 further includes a storage module 460.

The storage module 460 is configured to store, by the Android driver, an address pointer of the first private memory and a head of the first private service linked list into a structure of the first Android namespace.

The storage module 460 is further configured to store, by the Android driver, an address pointer of the first Android namespace into the structure of the first IPC namespace based on the PID of the first service manager.

Optionally, in some embodiments, the determining module 430 is specifically configured to: obtain, by the Android driver, a pointer of the structure of the first Android namespace from the structure of the first IPC namespace; and determine, by the Android driver, the first Android namespace based on the pointer of the structure of the first Android namespace.

Optionally, in some embodiments, the receiving module 410 is further configured to receive, by the Android driver, a second registration request sent by the second service manager, where the second registration request includes a PID of the second service manager.

The application module 450 is further configured to apply, by the Android driver, for a second Android namespace for the second container, where an address pointer of the second Android namespace is stored in a structure of a second IPC namespace associated with the second service manager.

The application module 450 is further configured to apply, by the Android driver, for second private memory for the second container, and create a second private service linked list, wherein the second private memory and a head of the second private service linked list are stored in the structure of the second Android namespace, the second private memory is used only to store content information in a request message sent by a process of an application service in the second container, and the second private service linked list is used only to store control information in the request message sent by the process of the application service in the second container.

Optionally, in some embodiments, the data processing apparatus 400 further includes a release module 470.

The receiving module 410 is further configured to receive a deletion request of the first container.

The release module 470 is configured to: when the first container needs to be deleted, release, by the Android driver, a storage space occupied by the first private service linked list and the first private memory.

The data processing apparatus 400 according to this embodiment of this application may correspondingly perform the method described in the embodiments of this application, and the foregoing and other operations and/or functions of the units in the data processing apparatus 400 are respectively used to implement corresponding procedures of the method in FIG. 3A and FIG. 3B. For brevity, details are not described herein again.

Figure 5:
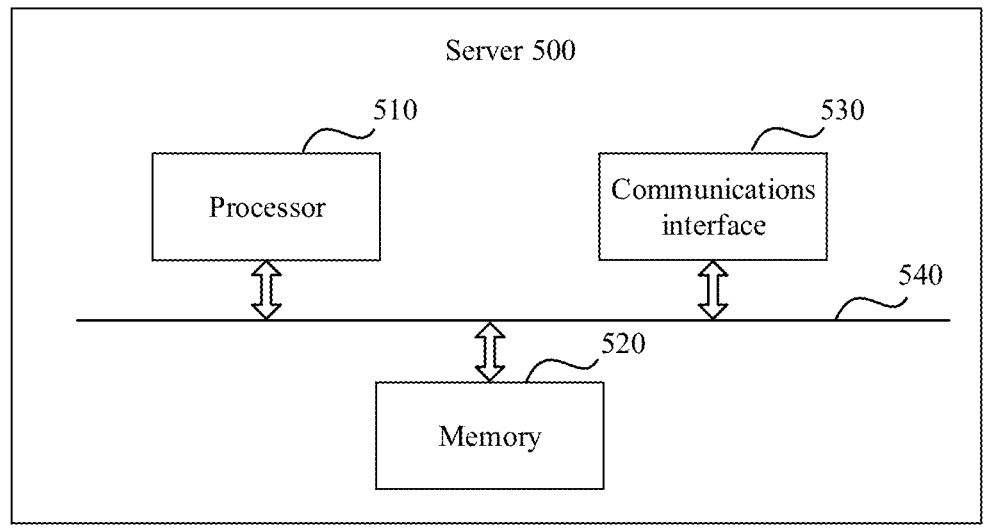
FIG. 5 is a schematic structural diagram of a server 500 according to an embodiment of this application.

FIG. 5 is a schematic structural diagram of a server 500 according to an embodiment of this application. The server 500 includes a processor 510, a memory 520, a communications interface 530, and a bus 550.

It should be understood that the processor 510 in the server 500 shown in FIG. 5 may correspond to the processing module 440 and the determining module 430 in the data processing apparatus 400 in FIG. 4. The communications interface 530 in the server 500 may correspond to the first receiving module 410 and the sending module 420 in the data processing apparatus 400.

The processor 510 may be connected to the memory 520. The memory 520 may be configured to store program code and data. Therefore, the memory 520 may be a storage unit inside the processor 510, or may be an external storage unit independent of the processor 510, or may be a component including a storage unit inside the processor 510 and an external storage unit independent of the processor 510.

Optionally, the server 500 may further include a bus 550. The memory 520 and the communications interface 530 may be connected to the processor 510 by using the bus 550. The bus 550 may be a peripheral component interconnect (Peripheral Component Interconnect, PCI) bus, an extended industry standard architecture (Extended Industry Standard Architecture, EISA) bus, or the like. The bus 550 may be an address bus, a data bus, a control bus, and the like. For ease of representation, only one line is used for representation in FIG. 5, but it does not mean that there is only one bus or only one type of bus.

It should be understood that, in this embodiment of this application, the processor 510 may use a central processing unit (central processing unit, CPU). The processor may be another general purpose processor, a digital signal processor (digital signal processor, DSP), an application-specific integrated circuit (application specific integrated circuit, ASIC), or a field programmable gate array (field programmable gate Array, FPGA) or another programmable logic device, a discrete gate or transistor logic device, a discrete hardware component, or the like. The general purpose processor may be a microprocessor, or the processor may be any conventional processor, or the like. Alternatively, the processor 510 uses one or more integrated circuits, and is configured to execute a related program, to implement the technical solutions provided in the embodiments of this application.

The memory 520 may include a read-only memory and a random access memory, and provide an instruction and data for the processor 510. A part of the processor 510 may further include a nonvolatile random access memory. For example, the processor 510 may further store information about a storage device type.

When the server 500 runs, the processor 510 executes a computer executable instruction in the memory 520, to perform the operation steps of the foregoing method by using a hardware resource in the server 500.

It should be understood that the server 500 according to this embodiment of this application may correspond to the data processing apparatus 400 in the embodiments of this application, and may correspond to a corresponding entity that performs the method shown in FIG. 2 in the embodiments of this application. In addition, the foregoing and other operations and/or functions of the modules in the server 500 are respectively used to implement corresponding procedures of the method in FIG. 3A and FIG. 3B. For brevity, details are not described herein again.

All or some of the foregoing embodiments may be implemented by using software, hardware, firmware, or any other combination. When software is used to implement the foregoing embodiments, all or some of the foregoing embodiments may be implemented in a form of a computer program product. The computer program product includes one or more computer instructions. When the computer program instructions are loaded or executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or transmitted from one computer readable storage medium to another computer readable storage medium, for example, the computer instructions may be transmitted from a website, computer, server, or data center via wired (for example, through a coaxial cable, an optical fiber, or a digital subscriber line (DSL)) or wireless (for example, infrared, wireless, or microwave) transmission to another website, computer, server, or data center. The computer-readable storage medium may be any usable medium accessible by a computer, or a data storage device such as a server or a data center that includes one or more usable medium sets. The usable medium may be a magnetic medium (for example, a floppy disk, a hard disk, or a magnetic tape), an optical medium (for example, a DVD), or a semiconductor medium. The semiconductor medium may be a solid state drive (solid state drive, SSD).

A person of ordinary skill in the art may be aware that units and algorithm steps in the examples described with reference to the embodiments disclosed in this specification may be implemented by electronic hardware or a combination of computer software and electronic hardware. Whether these functions are performed in a hardware or software manner depends on specific applications and design constraints of the technical solution. A person skilled in the art may use different methods to implement the described functions for each specific application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, and the indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

The foregoing descriptions are merely specific implementations of this application. Any variation or replacement figured out by a person skilled in the art based on the specific implementations provided in this application shall fall within the protection scope of this application.

What is claimed is:

1. A data processing method, wherein the method comprises:

receiving, by a first service manager, a request message of a first process of an application service, wherein the application service is run in a first container and the first container is implemented by a server, the first service manager is implemented in the first container, the request message comprises control information, content information, and a process identifier (PID) of the first service manager, the PID uniquely identifies the first service manager, the control information includes identifiers of the first process and a second process, the second process is an application process that processes the request message, and the content information indicates content and data of the service request;

sending, by the first service manager, the request message to an operating system driver;

determining, by the operating system driver based on the PID of the first service manager in the request message, a first inter-process communication (IPC) namespace associated with the first service manager, wherein the operating system driver is implemented by the server;

determining, by the operating system driver based on a pointer of a structure of the first IPC namespace, a first operating system namespace associated with the first container, wherein the first operating system namespace records first private memory and a first private service linked list of the first container; and storing, by the operating system driver, the control information in the first private service linked list, and storing the content information in the first private memory, wherein the first private memory is used only to store content information in a request message sent by a process of the application service in the first container, and the first private service linked list is used only to record control information in the request message sent by the process of the application service in the first container.

2. The method according to claim 1, wherein before the sending, by the first service manager, the request message to the operating system driver, the method further comprises:
receiving, by the operating system driver, a first registration request sent by the first service manager, wherein the first registration request comprises the PID of the first service manager;
applying, by the operating system driver, for the first operating system namespace for the first container; and
applying, by the operating system driver, for the first private memory for the first container, and creating the first private service linked list.

3. The method of claim 2, wherein the method further comprises:
storing, by the operating system driver, an address pointer of the first private memory and a header of the first private service linked list into a structure of the first operating system namespace; and
storing, by the operating system driver, an address pointer of the first operating system namespace into the structure of the first IPC namespace based on the PID of the first service manager in the first registration request.

4. The method according to claim 1, wherein the determining, by the operating system driver based on the pointer of the structure of the first IPC namespace, the first operating system namespace associated with the first container comprises:
obtaining, by the operating system driver, a structure pointer of the first operating system namespace from the structure of the first IPC namespace; and
determining, by the operating system driver, the first operating system namespace according to the structure pointer of the first operating system namespace.

5. The method according to claim 1, wherein the server further implements a second container, a second service manager is run in the second container, the second service manager is configured to manage an application service of the second container, both the application service run in the first container and the application service run in the second container each comprise at least two processes, and the method further comprises:
receiving, by the operating system driver, a second registration request sent by the second service manager, wherein the second registration request comprises a PID of the second service manager;
applying, by the operating system driver, for a second operating system namespace for the second container, wherein an address pointer of the second operating system namespace is stored in a structure of a second IPC namespace associated with the second service manager; and
applying, by the operating system driver, for second private memory for the second container, and creating a second private service linked list, wherein an address pointer of the second private memory and a head of the second private service linked list are stored in a structure of the second operating system namespace, the second private memory stores only content information in a request message sent by one of the at least two processes of the application service in the second container, and the second private service linked list only stores control information in the request message sent by the one of the at least two processes of the application service in the second container.

6. The method according to claim 1, wherein the method further comprises:
receiving, by the operating system driver, a deletion request of the first container; and
releasing, by the operating system driver, a storage space occupied by the first private service linked list and the first private memory.

7. A server, wherein the server comprises a processor and a memory, the memory is configured to store computer executable instructions, and when the server runs, the processor executes the computer executable instructions in the memory to perform the operation steps of:
receiving, by a first service manager, a request message of a first process of an application service, wherein the application service is run in a first container and the first container is implemented by the server, the first service manager is implemented in the first container, the request message comprises control information, content information, and a process identifier (PID) of the first service manager, the PID uniquely identifies the first service manager, the control information includes identifiers of the first process and a second process, the second process is an application process that processes the request message, and the content information indicates content and data of the service request;
sending the request message to an operating system driver;
determining, based on the PID of the first service manager in the request message, a first inter-process communication (IPC) namespace associated with the first service manager, wherein the operating system driver is implemented by the server;
determining, based on a pointer of a structure of the first IPC namespace, a first operating system namespace associated with the first container, wherein the first operating system namespace records first private memory and a first private service linked list of the first container; and
storing the control information in the first private service linked list, and storing the content information in the first private memory,
wherein the first private memory is used only to store content information in a request message sent by a process of the application service in the first container, and the first private service linked list is used only to record control information in the request message sent by the process of the application service in the first container.

8. The server of claim 7, wherein the processor executes the computer executable instructions in the memory to further perform the operation steps of:
receiving, before the sending the request message to the operating system driver, a first registration request sent by the first service manager, wherein the first registration request comprises the PID of the first service manager;
applying for the first operating system namespace for the first container; and
applying for the first private memory for the first container, and creating the first private service linked list.

9. The server of claim 8, wherein the processor executes the computer executable instructions in the memory to further perform the operation steps of:

storing an address pointer of the first private memory and a header of the first private service linked list into a structure of the first operating system namespace; and storing an address pointer of the first operating system namespace into the structure of the first IPC namespace based on the PID of the first service manager in the first registration request.

10. The server of claim 7, wherein the processor executes the computer executable instructions in the memory to determining, based on the pointer of the structure of the first IPC namespace, a first operating system namespace by:

obtaining a structure pointer of the first operating system namespace from the structure of the first IPC namespace; and determining the first operating system namespace according to the structure pointer of the first operating system namespace.

11. The server of claim 7, wherein the processor executes the computer executable instructions in the memory to further perform the operation steps of:

receiving a second registration request sent by a second service manager, wherein the second registration request comprises a PID of the second service manager;

applying for a second operating system namespace for a second container, wherein an address pointer of the second operating system namespace is stored in a structure of a second IPC namespace associated with the second service manager; and applying for second private memory for the second container; and creating a second private service linked list, wherein an address pointer of the second private memory and a head of the second private service linked list are stored in a structure of the second operating system namespace, the second private memory stores only content information in a request message sent by a process of an application service run in the second container, and the second private service linked list stores only control information in the request message sent by the process of the application service in the second container.

12. The server of claim 7, wherein the processor executes the computer executable instructions in the memory to further perform the operation steps of:

receiving a deletion request of the first container; and releasing a storage space occupied by the first private service linked list and the first private memory.

13. A non-transitory computer-readable storage medium comprising instructions which, when executed by a computer, cause the computer to carry out steps of:

receiving, by a first service manager, a request message of a first process of an application service, wherein the application service is run in a first container and the first container is implemented by the server, the first service manager is implemented in the first container, the request message comprises control information, content information, and a process identifier (PID) of the first service manager, the PID uniquely identifies the first service manager, the control information includes identifiers of the first process and a second process, the second process is an application process that processes the request message, and the content information indicates content and data of the service request;

sending the request message to an operating system driver;

determining, based on the PID of the first service manager in the request message, a first inter-process communication (IPC) namespace associated with the first service manager, wherein the operating system driver is implemented by the server;

determining, based on a pointer of a structure of the first IPC namespace, a first operating system namespace associated with the first container, wherein the first operating system namespace records first private memory and a first private service linked list of the first container; and storing the control information in the first private service linked list, and storing the content information in the first private memory, wherein the first private memory is used only to store content information in a request message sent by a process of the application service in the first container, and the first private service linked list is used only to record control information in the request message sent by the process of the application service in the first container.

14. The non-transitory computer-readable storage medium of claim 13 wherein the instructions, when executed by a computer, further cause the computer to carry out steps of:

receiving, before the sending the request message to the operating system driver, a first registration request sent by the first service manager, wherein the first registration request comprises the PID of the first service manager;

applying for the first operating system namespace for the first container; and applying for the first private memory for the first container, and creating the first private service linked list.

15. The non-transitory computer-readable storage medium of claim 14 wherein the instructions, when executed by a computer, further cause the computer to carry out steps of:

storing an address pointer of the first private memory and a header of the first private service linked list into a structure of the first operating system namespace; and storing an address pointer of the first operating system namespace into the structure of the first IPC namespace based on the PID of the first service manager in the first registration request.

16. The non-transitory computer-readable storage medium of claim 13 wherein the instructions, when executed by a computer, cause the computer to determine, based on the pointer of the structure of the first IPC namespace, a first operating system namespace by:

obtaining a structure pointer of the first operating system namespace from the structure of the first IPC namespace; and determining the first operating system namespace according to the structure pointer of the first operating system namespace.

17. The non-transitory computer-readable storage medium of claim 13 wherein the instructions, when executed by a computer, further cause the computer to carry out steps of:

receiving a second registration request sent by the second service manager, wherein the second registration request comprises a MD of the second service manager;

applying for a second operating system namespace for a second container, wherein an address pointer of the second operating system namespace is stored in a structure of a second IPC namespace associated with the second service manager; and applying for second private memory for the second container; and creating a second private service linked list, wherein an address pointer of the second private memory and a head of the second private service linked list are stored in a structure of the second operating system namespace, the second private memory stores only content information in a request message sent by a process of an application service run in the second container, and the second private service linked list stores only control information in the request message sent by the process of the application service in the second container.

18. The non-transitory computer-readable storage medium of claim 13 wherein the instructions, when executed by a computer, further cause the computer to carry out steps of:

receiving a deletion request of the first container; and releasing a storage space occupied by the first private service linked list and the first private memory.

* * * * *